(12) United States Patent
Park et al.

(10) Patent No.: US 9,548,611 B2
(45) Date of Patent: Jan. 17, 2017

(54) METHOD FOR GENERATING INJECTED CURRENT OF FUEL CELL STACK AND APPARATUS PERFORMING THE SAME

(71) Applicant: Hyundai Autron Co., Ltd., Seongnam-si (KR)

(72) Inventors: Hyun-Seok Park, Gunpo-Si (KR); Sung-Mog Yu, Suwon-si (KR); Jin-Ho Cho, Suwon-si (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 420 days.

(21) Appl. No.: 14/135,255

(22) Filed: Dec. 19, 2013

(65) Prior Publication Data

US 2014/0175890 A1    Jun. 26, 2014

(30) Foreign Application Priority Data

Dec. 20, 2012    (KR) .................. 10-2012-0149365

(51) Int. Cl.
*H02J 3/01*    (2006.01)
*H02J 1/00*    (2006.01)

(52) U.S. Cl.
CPC ............ *H02J 3/01* (2013.01); *H02J 2001/004* (2013.01); *Y02E 40/40* (2013.01); *Y10T 307/718* (2015.04)

(58) Field of Classification Search
None
See application file for complete search history.

(56) References Cited

U.S. PATENT DOCUMENTS

| 2006/0074574 A1* | 4/2006 | Gasda ............... H01M 8/04559 702/63 |
| 2007/0196707 A1* | 8/2007 | Komachiya ......... H01M 4/8642 429/432 |
| 2012/0135327 A1* | 5/2012 | Jeong ............... H01M 8/04313 429/431 |

FOREIGN PATENT DOCUMENTS

| KR | 10-2010-0121354 | 11/2010 |
| KR | 10-1090705 B1 | 12/2011 |

* cited by examiner

*Primary Examiner* — Rexford Barnie
*Assistant Examiner* — Swarna N Chowdhuri
(74) *Attorney, Agent, or Firm* — Morgan, Lewis & Bockius LLP

(57) ABSTRACT

Disclosed herein is a method for generating an injected current of a fuel cell stack performed in an apparatus for generating an injected current of a fuel cell stack, the method including: extracting a first frequency current and a second frequency current by passing alternating currents of different frequencies through a plurality of filters, respectively; generating a summed frequency current by summing the first frequency current and the second frequency current; and applying the summed frequency current to the fuel cell stack. Therefore, it is possible to operate the fuel cell stack by applying the summed current obtained by summing the alternating current for calculating the total harmonic distortion (THD) and the alternating current for calculating the impedance to the fuel cell stack.

8 Claims, 4 Drawing Sheets

210

220

300

METHOD FOR GENERATING INJECTED CURRENT OF FUEL CELL STACK AND APPARATUS PERFORMING THE SAME

CROSS REFERENCE TO RELATED APPLICATION

This application claims the benefit of Korean Patent Application No. 10-2012-0149365, filed on Dec. 20, 2012, which is hereby incorporated by reference in its entirety into this application.

BACKGROUND OF THE INVENTION

Technical Field

Exemplary embodiments of the present invention relate to a method for generating an injected current of a fuel cell stack and an apparatus performing the same.

Description of the Related Art

A fuel cell is a kind of power generating device that does not convert chemical energy of fuel into heat by combustion, but converts the chemical energy into electrical energy by an electrochemical reaction in a stack and may be used to supply power to a small electric/electrical product, particularly, a portable apparatus as well as supply industrial power, home power, and power for driving a vehicle.

As a power supply for driving the vehicle, a polymer electrolyte membrane fuel cell (PEMFC) (proton exchange membrane fuel cell) having the highest power density among fuel cells has been currently studied mainly. The polymer electrolyte membrane fuel cell has a rapid start time due to a low operation temperature and a rapid power conversion reacting time.

The polymer electrolyte membrane fuel cell is configured to include a membrane electrode assembly (MEA) in which catalyst electrode layers in which an electrochemical reaction occur are attached to both sides of a solid polymer electrolyte membrane through which hydrogen ions move, a gas diffusion layer (GLD) serving to uniformly distribute reaction gases and transfer generated electrical energy, a gasket and coupling mechanism maintaining air-tightness of the reaction gases and coolant and appropriate coupling pressure, and a bipolar plate moving the reaction gases and the coolant.

When a fuel cell stack is assembled using the configuration of a unit cell as described above, a combination of the membrane electrode assembly and the gas diffusion layer, which are main components, is positioned in the innermost portion of the cell, the membrane electrode assembly includes the catalyst electrode layers, that is, an anode and a cathode, formed on both surfaces of the polymer electrolyte membrane and having catalysts applied thereto so that oxygen and hydrogen may react to each other, and the gas diffusion layer, the gasket, and the like, are stacked on outer sides of the anode and the cathode.

The bipolar plate provided with a flow field supplying the reaction gases (hydrogen, which is fuel, and oxygen or air, which is an oxidizer) and passing the coolant therethrough is positioned at an outer side of the gas diffusion layer.

After a plurality of unit cells each having the above-mentioned configuration are stacked, a current collector, an insulating plate, and end plates supporting the stacked unit cells are coupled to the outermost portion. The unit cells are repeatedly stacked and coupled to each other between the end plates to configure the fuel cell stack.

In order to obtain potential actually required for the vehicle, the unit cells should be stacked by the required potential, and a product formed by stacking the unit cells is called a stack. Potential generated by one unit cell is about 1.3V. Therefore, a plurality of cells are stacked in series with each other in order to generate power required for driving the vehicle.

Meanwhile, in a fuel cell vehicle, a voltage of a cell is used to detect performance, an operation state, a fault, and the like, of a stack, and is used for various controls of a system such as a flow rate control of reaction gas. Typically, the bipolar plate is connected to a cell voltage monitoring apparatus through a connector and a conducting wire to monitor the voltage of the cell.

A cell voltage monitoring (CVM) apparatus according to the related art, which directly monitors voltages of all cells or two cells in the stack, uses a scheme in which a main controller (host controller) collecting voltages of all cells integrates and processes monitoring information and a voltage drop generated due to a fault result rather than a fault cause is monitored.

The cell voltage monitoring apparatus as described above has also been used to monitor a battery. Since the cell voltage monitoring apparatus according to the related art directly monitors the voltages of the cells, a position of a fault cell may be monitored. However, since the cell voltage monitoring apparatus according to the related art has a very complicated circuit configuration, it may be difficult to assemble and maintain the cell voltage monitoring apparatus according to the related art. In addition, the cell voltage monitoring apparatus according to the related art is expensive and may not detect a fault cause of the stack.

Further, an electrochemical impedance spectroscopy (EIS) has been used as the related art. The EIS is mainly used to detect an electrode reaction or a feature of a complex in an electrochemical field. The EIS may obtain general information on a nature, a structure, and a reaction of the complex by analyzing a system response and has also been used as a very useful tool in an applied chemistry field, a medical engineering field, a bioengineering field, or the like.

However, the EIS, which is for an off-line, requires a long testing time, may not perform real-time monitoring, is expensive, and may be used only for testing a unit cell.

SUMMARY OF THE INVENTION

An object of the present invention is to provide a method for generating an injected current of a fuel cell stack capable of operating the fuel cell stack by applying a summed current obtained by summing an alternating current for calculating a total harmonic distortion (THD) and an alternating current for calculating an impedance to the fuel cell stack, and an apparatus performing the same.

Objects to be solved by the present invention are not limited to the above-mentioned objects, and other objects that are not mentioned may be clearly understood by those skilled in the art in the following description.

According to an exemplary embodiment of the present invention, there is provided a method for generating an injected current of a fuel cell stack performed in an apparatus for generating an injected current of a fuel cell stack, the method including: extracting a first frequency current and a second frequency current by passing alternating currents of different frequencies through a plurality of filters, respectively; generating a summed frequency current by summing the first frequency current and the second frequency current; and applying the summed frequency current to the fuel cell stack.

The plurality of filters may include a band pass filter (BPF) passing only a specific frequency therethrough.

The extracting of the first frequency current and the second frequency current may include extracting the first frequency current by passing only a specific frequency in the alternating current; and extracting the second frequency current by passing only a specific frequency in the alternating current.

Each of the first frequency current and the second frequency current may be used for calculating at least one of total harmonic distortion (THD) and impedance.

The method may further include determining whether or not a fault is generated in the fuel cell stack using an output voltage of the fuel cell stack.

According to another exemplary embodiment of the present invention, there is provided an apparatus for generating an injected current of a fuel cell stack, the apparatus including: alternating current generating units generating alternating currents of different frequencies; a plurality of filters each extracting a first frequency current and a second frequency current from the alternating currents of the different frequencies; and a current summing unit generating a summed frequency current by summing the first frequency current and the second frequency current and applying the summed frequency current to the fuel cell stack.

The plurality of filters may include a band pass filter (BPF) passing only a specific frequency therethrough.

The plurality of filters may extract the first frequency current by passing only a specific frequency in the alternating current; and extract the second frequency current by passing only a specific frequency in the alternating current.

Each of the first frequency current and the second frequency current may be used for calculating at least one of the total harmonic distortion (THD) and the impedance.

The apparatus may further include a fuel cell stack fault diagnosing unit determining whether or not a fault is generated in the fuel cell stack using an output voltage of the fuel cell stack.

Specific matters of other exemplary embodiments will be included in a detailed description and the accompanying drawings.

Advantages and/or features of the present invention and methods to achieve them will be elucidated from exemplary embodiments described below in detail with reference to the accompanying drawings. However, the present invention is not limited to exemplary embodiment disclosed below, but will be implemented in various forms. The exemplary embodiments of the present invention make disclosure of the present invention thorough and are provided so that the scope of the present invention is fully conveyed to those skilled in the art. Therefore, the present invention will be defined by the scope of the appended claims. Like reference numerals denote like elements throughout the description.

DESCRIPTION OF THE EXEMPLARY EMBODIMENTS

Hereinafter, exemplary embodiments of the present invention will be described in detail with reference to the accompanying drawings.

Figure 1:
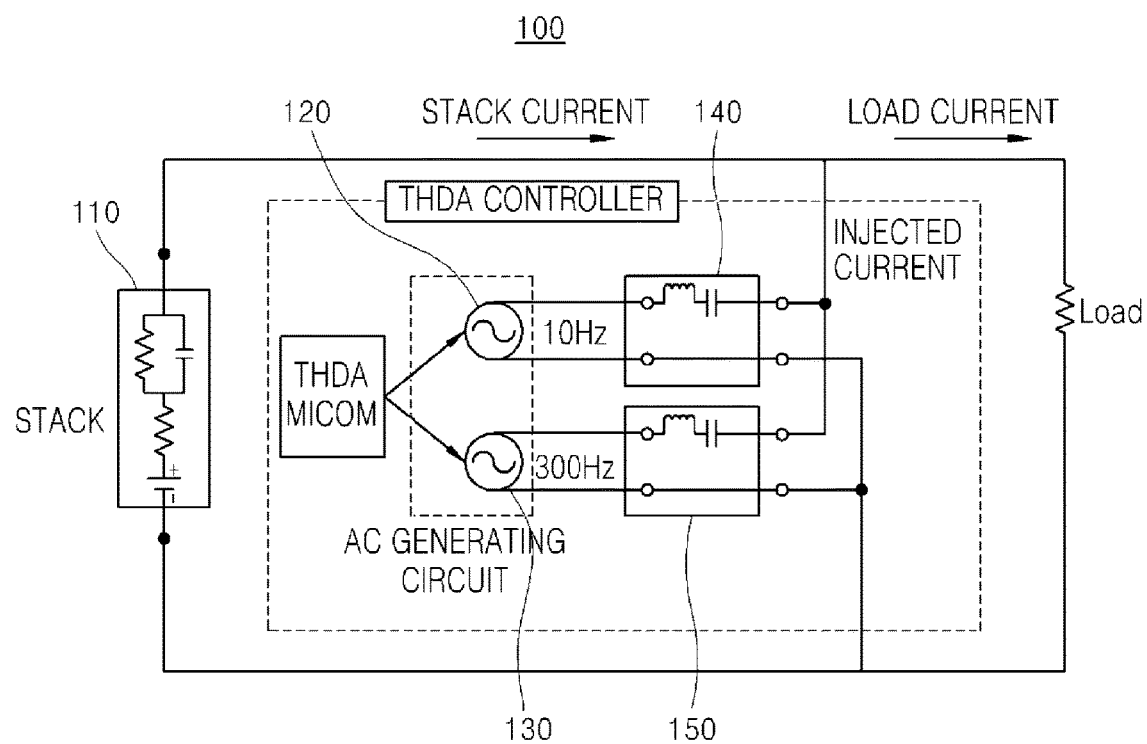
FIG. 1 is a diagram illustrating a connection state of an apparatus for generating an injected current of a fuel cell stack for performing a method for generating an injected current of a fuel cell stack according to an exemplary embodiment of the present invention.
Figure 2:
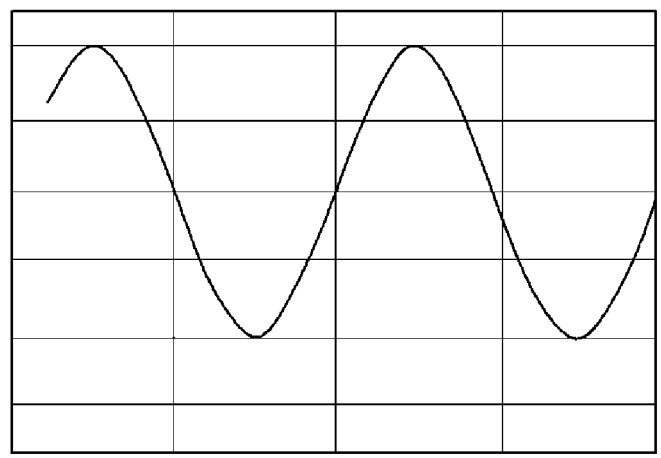
FIG. 2 is a diagram showing an alternating current generated by each of the first alternating current generator and the second alternating current generator illustrated in FIG. 1.
Figure 2:
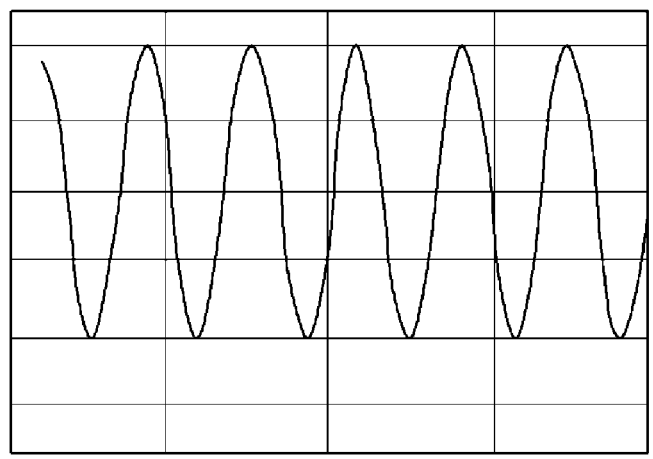
Figure 3:
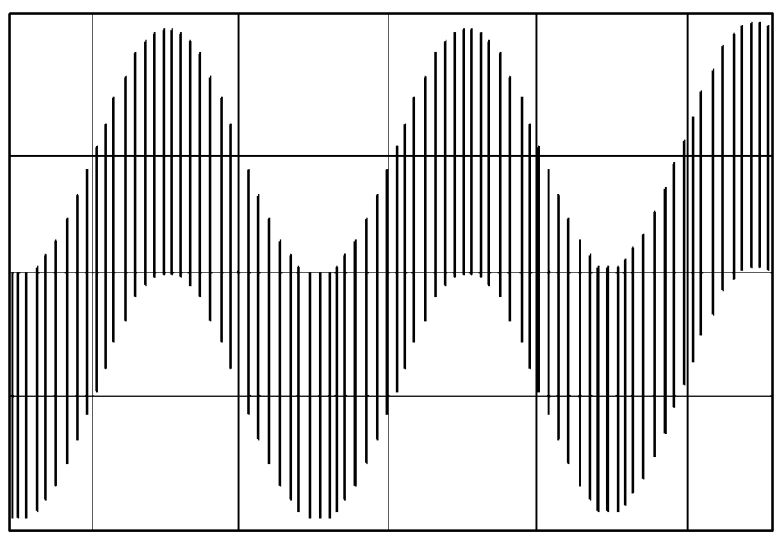
FIG. 3 is a diagram showing a summed current obtained by summing a current filtered by each of the first and second frequency filters illustrated in FIG. 1.

FIG. 1 is a diagram illustrating a connection state of an apparatus for generating an injected current of a fuel cell stack for performing a method for generating an injected current of a fuel cell stack according to an exemplary embodiment of the present invention, FIG. 2 is a diagram showing an alternating current generated by each of the first alternating current generator and the second alternating current generator illustrated in FIG. 1, and FIG. 3 is a diagram showing a summed current obtained by summing a current filtered by each of the first and second frequency filters illustrated in FIG. 1.

Referring to FIGS. 1 to 3, an apparatus 100 for generating an injected current of a fuel cell stack is configured to include a fuel cell stack 110, a first alternating current generator 120, a second alternating current generator 130, a first frequency filter 140, a second frequency filter 150, and a current summing unit (not shown). In the embodiment of the present invention, the apparatus 100 for generating the injected current of a fuel cell stack may further include a fuel cell stack fault diagnosing unit (not shown).

The fuel cell stack 110 may be configured by continuously arranging a plurality of unit cells, and a diagnosis may start when a summed frequency current is applied to the fuel cell stack 110.

The first alternating current generator 120 may generate a first alternating current for calculating a total harmonic distortion (THD). In the exemplary embodiment of the present invention, the first alternating current generator 120 may generate an alternating current such as a graph 210 of FIG. 2.

The first frequency filter 140 may receive the alternating current generated by the first alternating current generator 120 to thereby extract a first frequency current. The first frequency filter 140 may provide the first frequency current to the current summing unit.

In the exemplary embodiment of the present invention, the first frequency filter 140 may pass only a specific frequency from the alternating current generated by the first alternating current generator 120 to thereby extract the first frequency current. For example, in the case in which a basic wave is 10 Hz, the first frequency filter 140 may extract a frequency of 10 Hz or more from the first alternating current. In the exemplary embodiment of the present invention, the first frequency filter 140 may include a band pass filter (BPF).

The second alternating current generator 130 may generate a second alternating current for calculating impedance. In the exemplary embodiment of the present invention, the second alternating current generator 130 may generate an alternating current such as a graph 220 of FIG. 2.

In the exemplary embodiment of the present invention, the second frequency filter 150 may pass only a specific frequency from the alternating current generated by the second alternating current generator 130 to thereby extract the second frequency current. For example, the second frequency filter 150 may extract a frequency of 300 Hz from the second alternating current. In the exemplary embodiment of the present invention, the second frequency filter 150 may include the band pass filter.

The current summing unit receives the first frequency current from the first frequency filter 140 and receives the second frequency current from the second frequency filter 150, and then sums the first frequency current and the second frequency current, thereby generating a summed frequency current such as a graph 300 of FIG. 3. The current summing unit applies the summed frequency current to the fuel cell stack 110.

Figure 4:
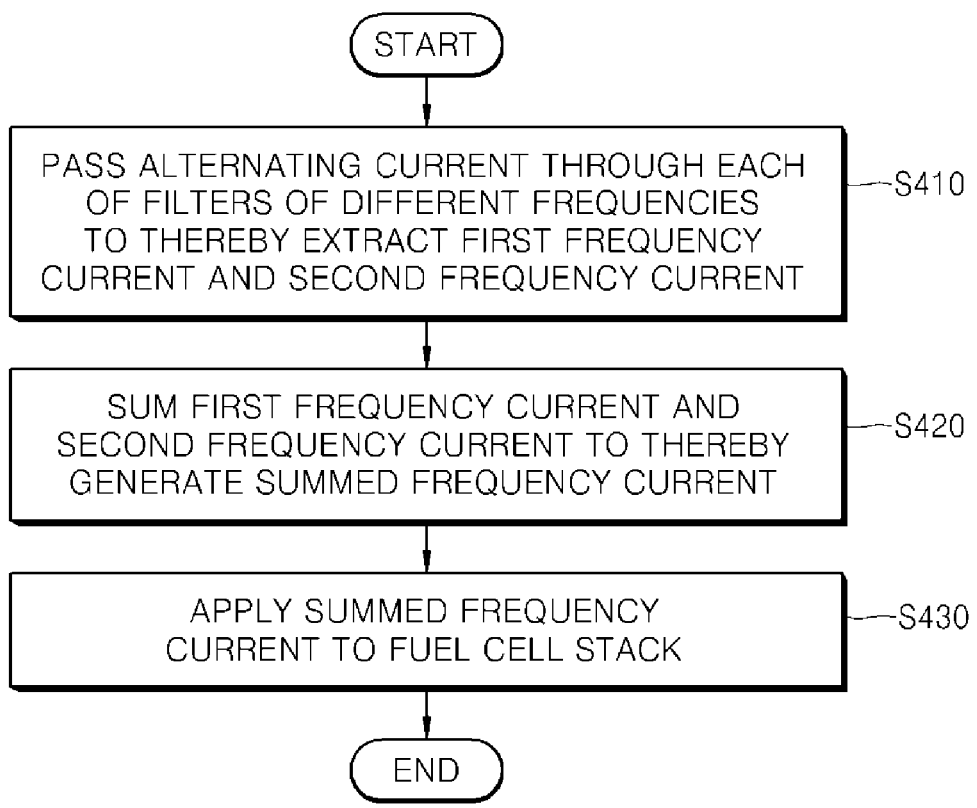
FIG. 4 is a flow chart for describing an example of a method for generating an injected current of a fuel cell stack according to an exemplary embodiment of the present invention.

FIG. 4 is a flow chart for describing an example of a method for generating an injected current of a fuel cell stack according to an exemplary embodiment of the present invention.

Referring to FIG. 4, the apparatus 100 for generating the injected current of the fuel cell stack passes alternating currents of different frequencies through each of the filters to thereby extract a first frequency current and a second frequency current (S410). The apparatus 100 for generating the injected current of the fuel cell stack sums the first frequency current and the second frequency current to thereby generate a summed frequency current (S420). The apparatus 100 for generating the injected current of the fuel cell stack applies the summed frequency current to the fuel cell stack (S430).

According to the exemplary embodiment of the present invention, it is possible to operate the fuel cell stack by applying the summed current obtained by summing the alternating current for calculating the total harmonic distortion (THD) and the alternating current for calculating the impedance to the fuel cell stack.

Hereinabove, although specific exemplary embodiments of the present invention have been described, various modifications may be made without departing from the scope of the present invention. Accordingly, the scope of the present invention is not construed as being limited to the described exemplary embodiments, but should be defined by the following claims as well as equivalents thereof.

Although the present invention has been described with reference to the exemplary embodiments and the accompanying drawings, it is not limited to the above-mentioned exemplary embodiments, but may be variously modified and altered from the above description by those skilled in the art to which the present invention pertains. Therefore, the scope and spirit of the present invention should be understood only by the following claims, and all of the equivalences and equivalent modifications of the claims should be intended to fall within the scope and spirit of the present invention.

What is claimed is:

1. A method for generating an injected current of a fuel cell stack performed in an apparatus for generating an injected current of a fuel cell stack, the method comprising:
   extracting a first frequency current and a second frequency current by passing alternating currents generated by a plurality of alternating current generators through a plurality of filters, respectively;
   generating a summed frequency current by summing the first frequency current and the second frequency current; and
   applying the summed frequency current to the fuel cell stack,
   wherein the plurality of filters include band pass filters including a first frequency filter extracting a first frequency used for calculating a total harmonic distortion and a second frequency filter extracting a second frequency used for calculating an impedance.

2. The method of claim 1, wherein the extracting of the first frequency current and the second frequency current includes:
   extracting the first frequency current by passing the alternating current through the first frequency filter; and
   extracting the second frequency current by passing the alternating current through the second frequency filter.

3. The method of claim 2, wherein each of the first frequency current and the second frequency current is used for calculating at least one of the total harmonic distortion (THD) and the impedance.

4. The method of claim 1, further comprising determining whether or not a fault is generated in the fuel cell stack using an output voltage of the fuel cell stack.

5. An apparatus for generating an injected current of a fuel cell stack, the apparatus comprising:
   a plurality of alternating current generating units generating alternating currents of different frequencies;
   a plurality of filters each extracting a first frequency current and a second frequency current from each of the alternating currents generated by the plurality of alternating current generating units; and
   a current summing unit generating a summed frequency current by summing the first frequency current and the second frequency current and applying the summed frequency current to the fuel cell stack,
   wherein the plurality of filters include band pass filters including a first frequency filter extracting a first frequency used for calculating a total harmonic distortion and a second frequency filter extracting a second frequency used for calculating an impedance.

6. The apparatus of claim 5, wherein the first frequency filter extracts the first frequency current by passing only a specific frequency in the alternating current therethrough, and the second frequency filter extracts the second frequency current by passing only a specific frequency in the alternating current therethrough.

7. The apparatus of claim 6, wherein each of the first frequency current and the second frequency current is used for calculating at least one of the total harmonic distortion (THD) and the impedance.

8. The apparatus of claim 5, further comprising a fuel cell stack fault diagnosing unit determining whether or not a fault is generated in the fuel cell stack using an output voltage of the fuel cell stack.

* * * * *